(12) United States Patent
Wilson et al.

(10) Patent No.: US 12,097,583 B2
(45) Date of Patent: Sep. 24, 2024

(54) METHOD OF IN-SITU REPAIR OF AN ULTRA-LARGE SINGLE-PIECE CASTING

(71) Applicant: GM Global Technology Operations LLC, Detroit, MI (US)

(72) Inventors: Daniel J. Wilson, Linden, MI (US); Liang Wang, Rochester Hills, MI (US); Qigui Wang, Rochester Hills, MI (US); Devin R Hess, Clarkston, MI (US); Michelle A. Wood, Lake Orion, MI (US); Ali Shabbir, Windsor (CA); Ronald C. Daul, Northville, MI (US); Dale A. Gerard, Warren, MI (US); Gregory Melekian, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 219 days.

(21) Appl. No.: 17/729,603

(22) Filed: Apr. 26, 2022

(65) Prior Publication Data
US 2023/0339052 A1    Oct. 26, 2023

(51) Int. Cl.
*B23P 6/04*    (2006.01)
(52) U.S. Cl.
CPC ...................... *B23P 6/04* (2013.01)
(58) Field of Classification Search
CPC .......................................... B23P 6/04
See application file for complete search history.

(56) References Cited

U.S. PATENT DOCUMENTS 4,988,033 A * 1/1991 Hesse .................. B23K 33/00
29/402.13

FOREIGN PATENT DOCUMENTS

DE        102021106754 B3 * 2/2022 ............. B62D 21/02

OTHER PUBLICATIONS

DE102021106754 English translation (Year: 2021).*

* cited by examiner

Primary Examiner — Jason L Vaughan
Assistant Examiner — Amanda Kreiling
(74) Attorney, Agent, or Firm — Vivacqua Crane, PLLC

(57) ABSTRACT

A method of repairing an ultra-large single-piece cast component of a vehicle body. The method includes the steps of locating a damaged portion of the cast component, determining an extent of the damaged portion of the ultra-large cast component, defining a cut-line sectioning off the damaged portion from an undamaged portion of the ultra-large cast component, cutting along the cut-line to excise the damaged portion from the undamaged portion of the ultra-large cast component, and joining a replacement piece to the undamaged portion of the ultra-large cast component. The replacement piece is fabricated based on the original manufacturer's geometry and dimensional data of the excised damaged portion. The undamaged portion of the ultra-large cast component remains on the vehicle body during the repair.

20 Claims, 6 Drawing Sheets

METHOD OF IN-SITU REPAIR OF AN ULTRA-LARGE SINGLE-PIECE CASTING

INTRODUCTION

The present disclosure relates to a method of repairing a casting, more particularly, to a method of repairing an ultra-large single-piece casting of a vehicle body component.

Traditional vehicle body designs include unibody designs and body-on-frame designs, which are made up of tens or hundreds of individual stamped panels and brackets, produced from a range of different materials that are joined together using welding, fasteners, and/or adhesives. In a unibody design, the body, floorboards, primary chassis structural support, and crash-protection elements are joined into a single piece or unit. In a body-on-frame design, the body and floorboard are joined and then assembled onto a support structure, such as a ladder frame, together with the crash-protection elements. The cutting, stamping, assembling, and joining of body panels are labor and time extensive.

Modern vehicles, especially those of electric vehicles, are moving toward a simpler vehicle body design by utilizing ultra-large single-piece castings that serve as a load bearing structure of the vehicle body. These large single-piece castings are often referred to as mega-castings or giga-castings due to the huge size of the die-casting machines used to make these castings. Ultra-large castings allow vehicle bodies to be lighter and less complex to manufacture by replacing the large number of stamped panels required to form the vehicle body with a single-piece casting. As an example, an ultra-large single-piece casting of a vehicle body component can have a width of at least 0.8 meter (m), a length of at least 1 m, and a height of at least 0.25 m. An ultra-large single-piece die-casting may have a projected area of at least 0.3 $m^2$ on a parting plane, which is typically normal to a die injection direction in a high pressure die casting.

Ultra-large castings of vehicle body components are manufactured by high pressure injection of an aluminum-silicon alloy in a die cavity. An advantage of die casting is that the die casting process can form light weight and high strength components with intricate details, thus, enabling manufactures of functional components that may function as a load bearing structure. One example is that of a floor casting having a complex geometry that supports the internal cabin of the vehicle. Another example is that of a battery tray having intricate geometry to house rechargeable batteries and serves as a stressed member of the vehicle body structure.

One disadvantage of using an ultra-large casting in manufacturing a vehicle body is that the entire single-piece casting is typically removed and replaced when it is damaged. Thus, while the current method of repairing ultra-large single-piece castings achieve their intended purpose, there is a need for an improved method of repairing such damaged castings without the need of removing and replacing the entire single-piece casting.

SUMMARY

According to several aspects, a method of repairing a cast component is disclosed. The method includes locating a damaged portion of the cast component; determining an extent of the damaged portion of the cast component; defining a cut-line sectioning off the damaged portion from an undamaged portion of the cast component; cutting along the cut-line to excise the damaged portion from the undamaged portion of the cast component; and joining a replacement piece to the undamaged portion of the cast component.

In an additional aspect of the present disclosure, determining an extent of the damaged portion of the cast component includes determining whether the damaged portion includes a load bearing structure. The method includes defining the cut-line to avoid cutting into the load bearing structure when the damaged portion does not include the load bearing structure and defining the cut-line to include a damaged load bearing structure portion when the damaged portion includes the load bearing structure.

In another aspect of the present disclosure, joining the replacement piece includes using a structural adhesive to join the replacement piece to the undamaged portion of the cast component when the damaged portion does not include the load bearing structure.

In another aspect of the present disclosure, wherein joining the replacement piece includes one of welding the replacement piece to the undamaged portion of the cast component and bolting the replacement piece to the undamaged portion of the cast component.

In another aspect of the present disclosure, the method further includes using a Direct Energy Deposition additive manufacturing to fabricate the replacement piece directly onto the undamaged portion of the cast component.

In another aspect of the present disclosure, the method further includes designing the replacement piece by using geometry and dimension data from a design specification of the cast component In another aspect of the present disclosure, the method further includes fabricating the replacement piece by additive manufacturing including at least one of a friction stir additive manufacturing, a powder bed fusion (PBF), a direct energy deposition (DED), and a droplet on demand (DOD) using cast aluminum alloy feed stock and powders.

In another aspect of the present disclosure, the method further includes manufacturing the replacement piece by 3-D printing a sand mold using a geometry and dimension data from a design specification of the cast component, pouring a molten alloy into the 3-D printed sand mold, and solidifying the molten alloy by cooling.

In another aspect of the present disclosure, wherein joining the replacement piece to the undamaged portion of the cast component includes providing a plurality of bolt brackets on the replacement piece, wherein each bolt bracket defines a bolt through-hole; drilling a plurality of bolt through-holes on the undamaged portion of the cast component; and bolting the replacement piece onto the undamaged portion of the cast component. The drilled bolt through-holes correspond to the bolt through-holes of the brackets when the replacement piece is joined to the undamaged portion of the ultra-large cast component.

According to several aspects, a method of in-situ repairing of an ultra-large casting of a vehicle body component is provided. The method includes locating a damaged portion of the ultra-large casting; inspecting the damaged portion to determine whether a load bearing structure is damage; defining a cut-line to avoid the load bearing structure when the load bearing structure is not damaged and defining the cut-line to include a damaged load bearing structure portion when the load bearing structure is damaged; cutting through the ultra-large casting at the cut-line to remove the damaged portion from an undamaged portion of the ultra-large casting; and joining a replacement piece to the undamaged portion of the ultra-large casting to replace the damaged portion. The ultra-large casting includes a width of at least 0.8 meter (m), a length of at least 1 m, and a height of at least 0.25 m.

In an additional aspect of the present disclosure, wherein joining the replacement piece to the undamaged portion of the ultra-large casting includes welding the replacement piece to the undamaged portion of the ultra-large casting or printing the replacement piece using Direct Energy Deposition (DED) directly onto the undamaged portion of the ultra-large casting.

In another aspect of the present disclosure, the method further includes fabricating the replacement piece including the steps of 3-D printing a sand mold using a geometry and dimension data from a design specification of the ultra-large casting; pouring a molten alloy into the 3-D printed sand mold; and solidifying the molten alloy by cooling. The replacement piece may also be manufactured by one of a friction stir additive manufacturing, a powder bed fusion (PBF), a direct energy deposition (DED), and a droplet on demand (DOD) using cast aluminum alloy feed stock and powders.

According to several aspects, a method of in-situ repairing of an ultra-large die casting cast in a 2-piece die is provided. The method includes defining a cut-line sectioning off a damaged portion from an undamaged portion of the ultra-large casting; excising the damaged portion by cutting along the cut-line; fabricating a replacement piece; and joining the replacement piece to the ultra-large casting in place of the excised damaged portion. The ultra-large die casting includes a projected area of at least 0.3 m$^2$ on a projection plane parallel to a parting plane of the 2-piece die.

The method further includes determining a damaged load bearing structure; defining the cut-line to include the damaged load bearing structure; and one of welding the replacement piece to the ultra-large casting and bolting the replacement piece to the ultra-large casting.

The method further includes determining a damaged load bearing structure; defining the cut-line to include the damaged load bearing structure; and printing the replacement piece using Direct Energy Deposition (DED) directly onto the ultra-large casting in place of the excised damaged portion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale, and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
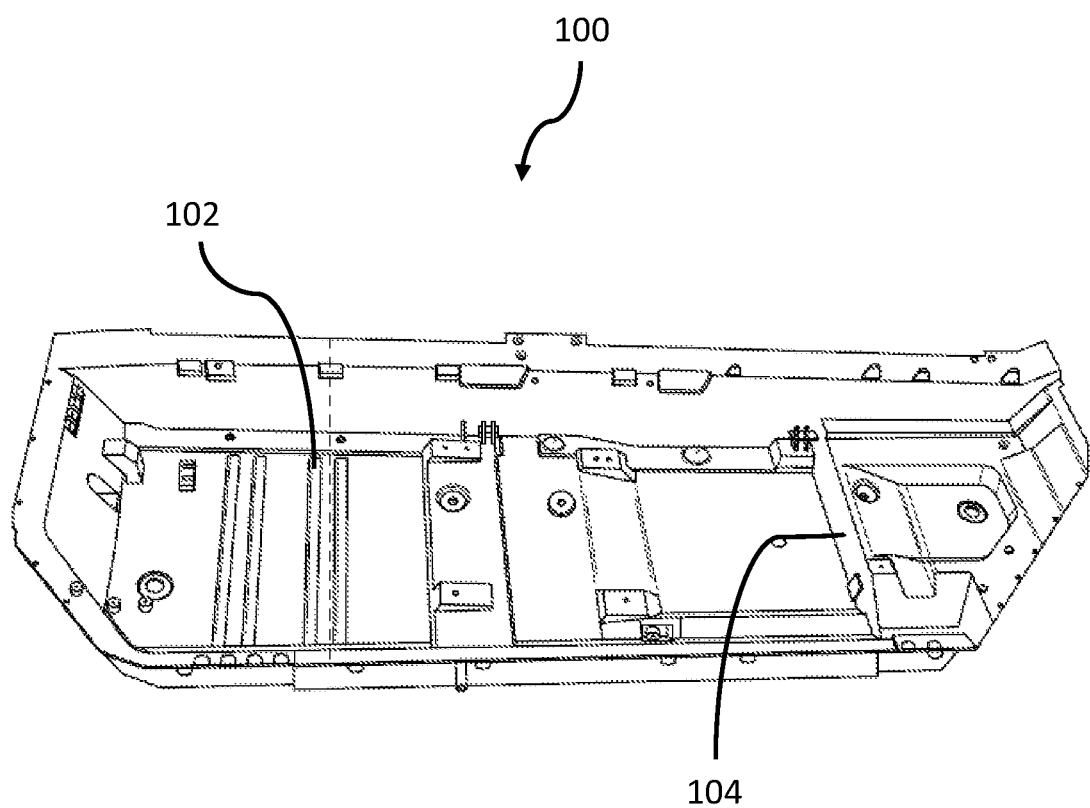
FIG. 1 is a perspective view of an ultra-large single-piece floor casting of a vehicle body, according to an exemplary embodiment.

FIG. 1 is a perspective view of a non-limiting example of an ultra-large single-piece casting 100 of a vehicle body component. The exemplary ultra-large single-piece casting 100 shown is that of a floor casting 100 having integrally cast structural support members 102, 104 such as laterally extending ribs 102 and bulkheads 104. The single-piece floor casting 100, including the integral structural support members 102, 104, is manufactured by casting an aluminum-silicon (Al—Si) alloy using a 5000 ton or greater capacity die-casting press. The molten Al—Si alloy is injected into a reusable 2-piece die at approximately 90 degrees to a parting plane of the 2-piece die. The parting plane is the plane where the 2-piece die is separated into 2 halves for the removal of the casting 100. The solidified ultra-large single-piece floor casting 100 is removed from the die, machined to design dimensions and tolerances, and heat treated as necessary to desired specifications.

It should be appreciated that ultra-large single-piece castings 100 are not limited to ultra-large floor castings 100 but may include any other die-cast components, such as a battery tray of an electric vehicle, having a projected area of at least 0.3 m² on a projection plane parallel to the parting plane of the 2-piece die. Additionally, ultra-large single-piece castings 100 may include die and other forms of castings that have dimensions of at least 1.0 m in length, at least 0.8 m in width, and at least 0.25 m in averaged height.

Figure 2A:
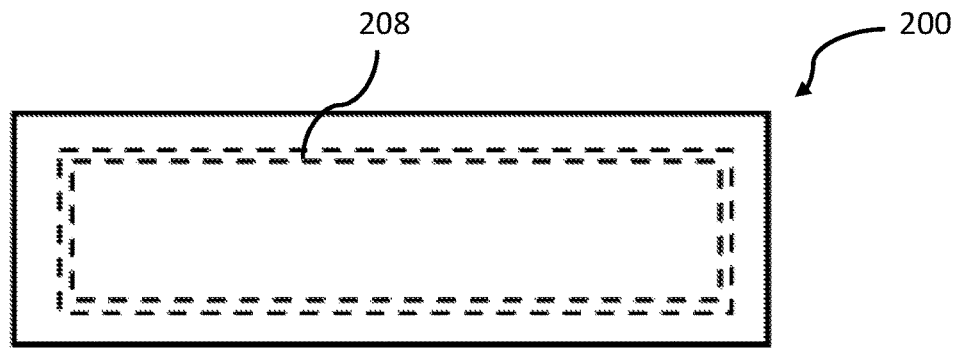
FIG. 2A is a plan view of an ultra-large single-piece casting representing a vehicle body component, according to an exemplary embodiment.
Figure 2B:
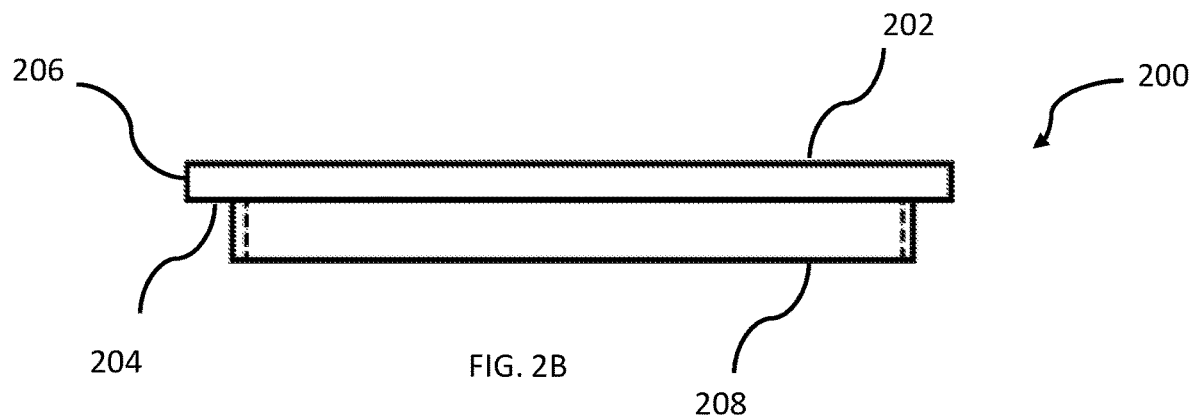
FIG. 2B, is a side view of the ultra-large single-piece casting of FIG. 2A.
Figure 2C:
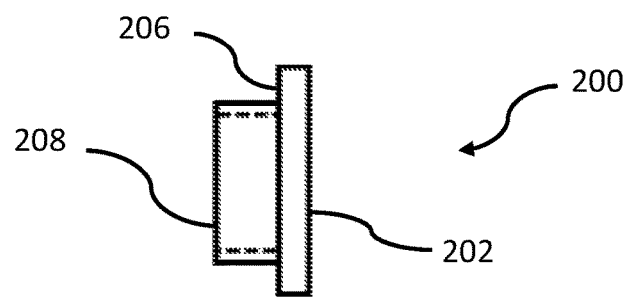
FIG. 2C, is an end view of the ultra-large single-piece casting of FIG. 2A.

FIGS. 2A, 2B, and 2C show a simplified non-limiting embodiment of an ultra-large single-piece casting 200 representing the floor casting 100 or any other ultra-large single-piece casting of a vehicle component. For brevity, the ultra-large single-piece casting 200 will be referred to as an ultra-large casting 200 for the purposes of this disclosure. FIG. 2A shows a top view of the ultra-large casting 200, FIG. 2B shows a side view of the ultra-large casting 200, and FIG. 2C shows an end view of the ultra-large casting 200. The exemplary ultra-large casting 200 includes a first surface 202, a second surface 204 opposite the first surface 202, and an edge surface 206 connecting the first surface 202 and the second surface 204. The second surface 204 defines a protruding rib 208 that represents a structural support member, also referred to as a load bearing structure 208. While the general shape of the exemplary ultra-large casting 200 is substantially rectangular, it should be appreciated it is not meant to be so limited. The exemplary embodiment of the ultra-large casting 200 may include any complex shapes and sizes that are applicable for use in a vehicle body component.

Figure 3:
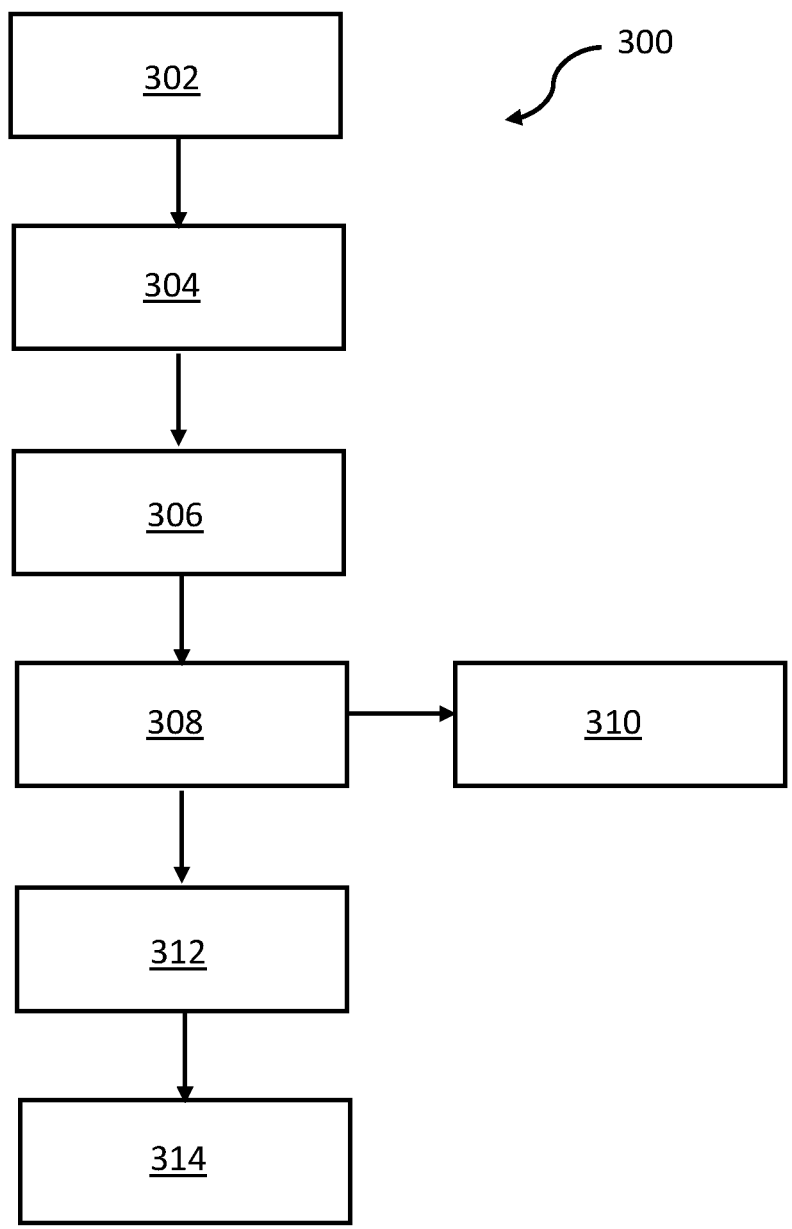
FIG. 3 is a block flowchart of a method of repairing the ultra-large single-piece casting, according to an exemplary embodiment.
Figure 4:
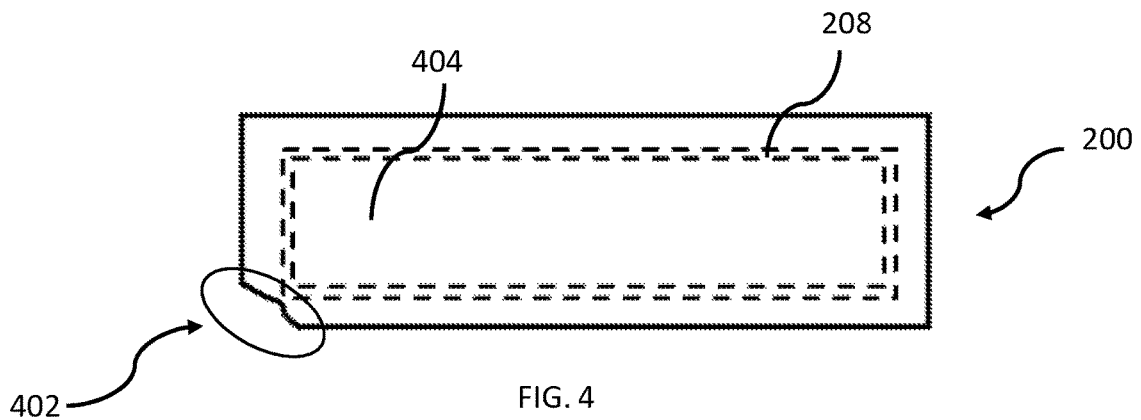
FIG. 4 is a plan view of an ultra-large single-piece casting having a damaged portion, according to an exemplary embodiment.
Figure 5:
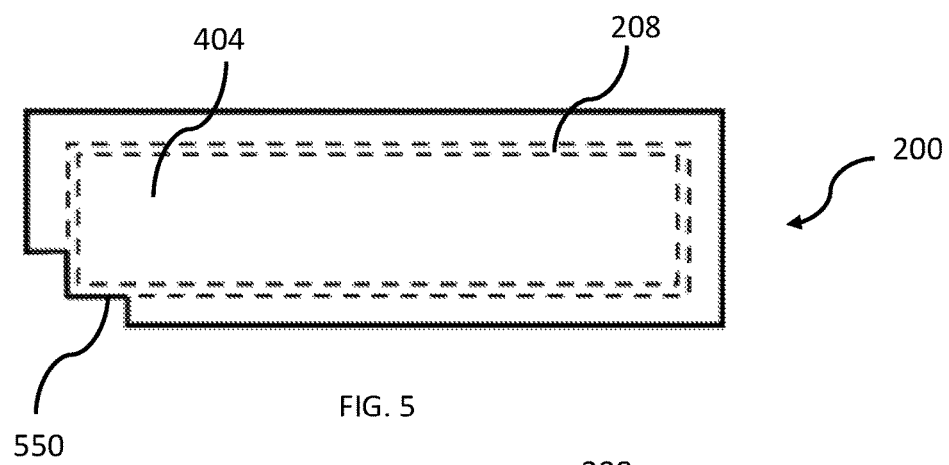
FIG. 5 is a plan view of one embodiment of an ultra-large single-piece casting having the damaged portion excised.
Figure 6:
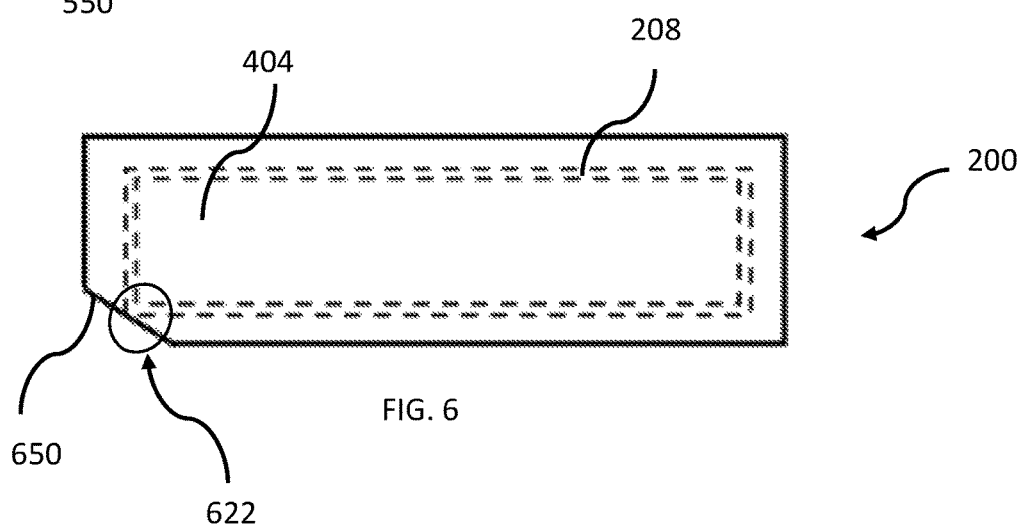
FIG. 6 is a plan view of another embodiment of an ultra-large single-piece casting having the damaged portion excised.

FIG. 3 is a block flowchart showing a Method 300 of repairing the ultra-large casting 200. The Method 300 starts in Block 302, when the ultra-large single-piece casting 200 sustained damaged. For illustrative purposes and not meant to be limiting, FIG. 4 shows a top view of the ultra-large casting 200 having a damaged portion 402. The damaged portion 402 may or may not include damage to the load bearing structure 208. FIG. 5 shows the damaged portion 402 not including a damaged load bearing structure 208. FIG. 6 shows the damaged portion 402 including a damaged load bearing structure portion 622. It should be appreciated that in most instances, the Method 300 may be performed in-situ, meaning the repair can be made on ultra-large casting 200 without having to remove the ultra-large casting 200 from the vehicle body. Moving to Block 304 from Block 302.

In Block 304, the damaged portion 402 of the ultra-large casting is located and analyzed to determine an appropriate repair solution. The damaged portion 402 is inspected to determine the extent of the damage including determining whether there is damage to the load bearing structure 208. A repair solution is developed based on the location of the damaged portion 402 and whether the damaged portion 402 includes damage to the load bearing structure 208. Moving to Block 306 from Block 304.

In Block 306, the repair solution includes defining a cut-line 550, 650, best shown in FIGS. 5 and 6, sectioning off the damaged portion 402 from the remainder or undamaged portion 404 of the ultra-large casting 200, removing the damaged portion 402 by cutting along the cut-line 550, 650, fabricating a replacement piece, and joining the replacement piece to the ultra-large casting 200. The defined cut-line 550, 650 and a method of joining the replacement piece to the undamaged portion 404 of the ultra-large casting 200 is determined based on whether the damaged portion 402 includes a damaged load bearing structure 208.

Referring to FIG. 5, when the damaged portion 402 does not include the load bearing structure 208, the cut-line 550 is defined to remove the damaged portion 402 without cutting into the load bearing structure 208. Referring to FIG. 6, when the damaged portion 402 includes a damaged load bearing structure portion 622, the cut-line 650 is defined to include the damaged load bearing structure portion 622 in the damaged portion 402 to be excised. Moving to Block 308 from Block 306.

In Block 308, the replacement piece is designed using the geometry and dimensions in the design prints and design data of an undamaged ultra-large casting 200. In one embodiment, the replacement piece may be rapidly fabricated using additive manufacturing including powder bed fusion (PBF), direct energy deposition (DED), and droplet on demand (DOD) using cast aluminum alloy feed stock and powders. In another embodiment, the replacement piece may be cast by pouring molten alloy into sand mold that was 3-D printed using the original manufacturer's design data. The additively manufactured replacement piece and the sand cast replacement piece may be heat treated and machined to original specification before being joined to the undamaged portion 404 of the ultra-large casting 200. The Method 300 moves to Block 310 from Block 308 when the damaged portion 402 does not include a portion of the load bearing structure 208, or the Method 300 moves to Block 312 from Block 308 when the damaged portion 402 does include a damaged load bearing structure portion 622.

In Block 310, referring to FIG. 4 and FIG. 5, when the damaged portion 402 does not include a damaged load bearing structure 208, the damaged portion 402 is excised from the undamaged portion 404 of the ultra-large casting 200 along the cut-line 550. Local cutting may be done by small hand or electric saws, laser or electronic beam, plasma cutting tool, water jets, or by any other cutting means to cut through the ultra-large casting along the cut-line. The replacement piece may be joined to the undamaged portion 404 of the ultra-large casting 200 at the cut-interface defined by the cut-line 550 with structural adhesives. A non-limiting example of a structural adhesive to join the replacement piece to the ultra-large casting is an aluminum filler type structural adhesive available from 3M™. The Method 300 ends.

In Block 312, referring to FIG. 4 and FIG. 6, when the damaged portion 402 does include a damaged load bearing structure portion 622, the cut-line 650 is defined to include the damaged load bearing structure portion 622 in the damaged portion 402 to be excised. The damaged portion 402, including the damaged load bearing structure portion 622, is excised from ultra-large casting along the cut-line 650. Local cutting may be done by small hand or electric saws, laser or electronic beam, plasma cutting tool, water jets, or by any other cutting means to cut through the ultra-large casting along the cut-line. The replacement piece may be joined to the ultra-large casting at the cut-interface by mechanical means such as brackets and bolts as shown in FIG. 7A, 7B, 7C or by welding as shown in FIGS. 8A, 8B, 8C.

Figure 7A:
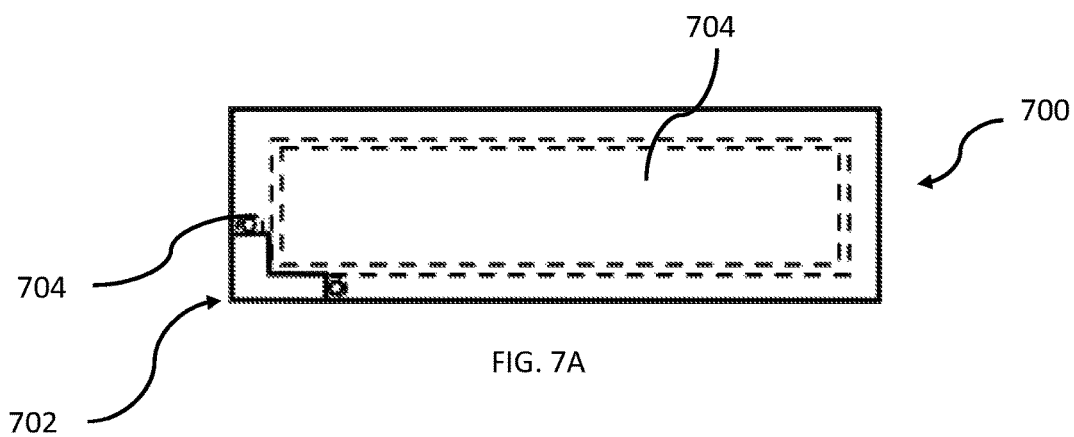
FIG. 7A is a plan view of a repaired ultra-large single-piece casting of FIG. 5, according to an exemplary embodiment.
Figure 7B:
FIG. 7B is a side view of the repaired ultra-large single-piece casting of FIG. 5.
Figure 7C:
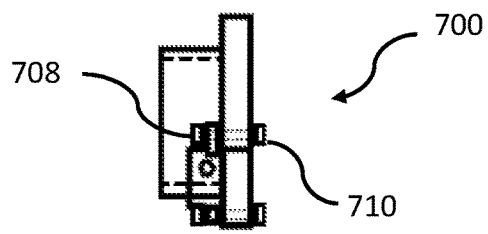
FIG. 7C is an end view of the repaired ultra-large single-piece casting of FIG. 5.
Figure 7D:
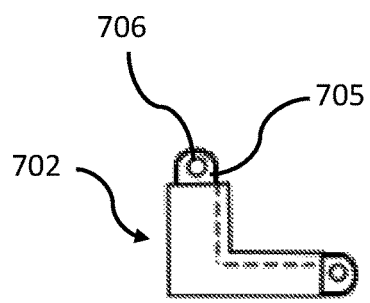
FIG. 7D is a plan view of a replacement piece for the ultra-large single-piece casting of FIG. 5, according to an exemplary embodiment.
Figure 7E:
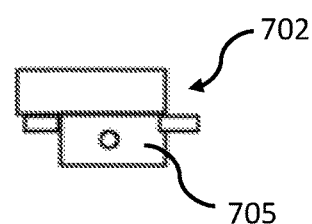
FIG. 7E is a side view of the replacement piece for the ultra-large single-piece casting of FIG. 5.
Figure 7F:
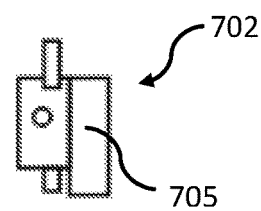
FIG. 7F is an end view of the replacement piece for the ultra-large single-piece casting of FIG. 5.

Referring to FIGS. 7A-7F. FIG. 7A is a plan view, FIG. 7B is a side view, and FIG. 7C is an end view of a repaired ultra-large casting 700. FIG. 7D is a plan view, FIG. 7E is a side view, and FIG. 7F is an end view of the replacement piece 702 having mechanical means for joining to the undamaged portion 704. The mechanical means shown are bolt brackets 705 formed with the replacement piece 702 either by additive manufacturing or casting. Each of the bolt brackets 705 defines a bolt through-hole 706 for an insertion of a bolt 708 therethrough. Where the bolt brackets 705 are attached to the undamaged portion 704 of the ultra-large casting 700, corresponding bolt through-holes may be drilled through the undamaged portion 704 of the ultra-large casting 700 to match the locations of the bolt through-holes 706 defined on each bolt bracket 705. A bolt 708 and nut 710 may be used to secure the bolt brackets 705, and thus the replacement piece 702, onto the undamaged portion 704 of the ultra-large casting 700.

Figure 8A:
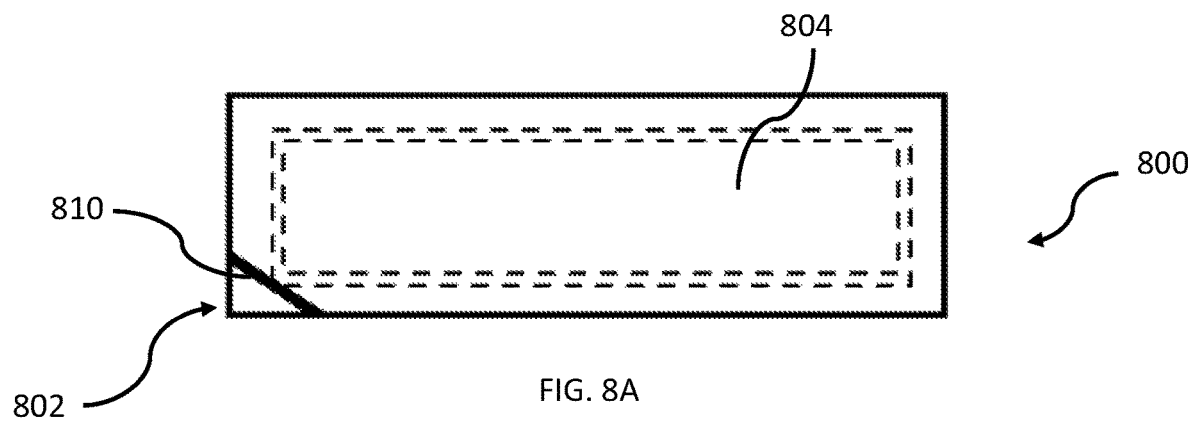
FIG. 8A is a plan view of a repaired ultra-large single-piece casting of FIG. 6, according to an exemplary embodiment.
Figure 8B:
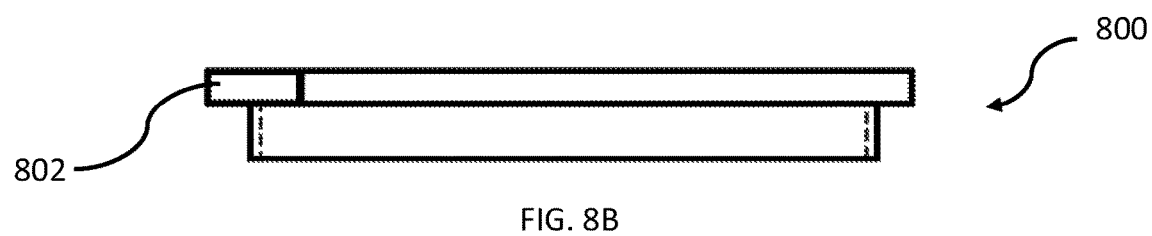
FIG. 8B is a side view of the repaired ultra-large single-piece casting of FIG. 6.
Figure 8C:
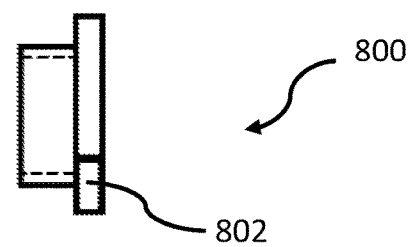
FIG. 8C is an end view of the repaired ultra-large single-piece casting of FIG. 6.
Figure 8D:
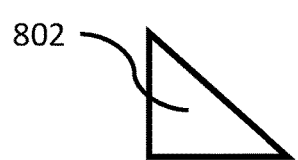
FIG. 8D is a plan view of a replacement piece for the ultra-large single-piece casting of FIG. 6, according to an exemplary embodiment.
Figure 8E:
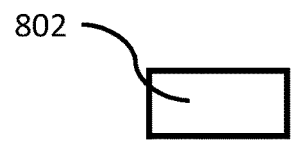
FIG. 8E is a side view of the replacement piece for the ultra-large single-piece casting of FIG. 6.
Figure 8F:
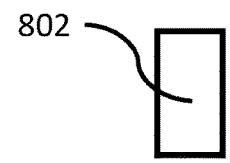
FIG. 8F is an end view of the repair piece for the ultra-large single-piece casting of FIG. 6.

Referring to FIGS. 8A-8F. FIG. 8A is a plan view, FIG. 8B is a side view, and FIG. 8C of a repaired ultra-large casting 800 having a welded replacement piece 802. FIG. 8D is a plan view, FIG. 8E is a side view, and FIG. 8F is an end view of the replacement piece 802. The replacement piece 802 may be manufactured by additive manufacturing or sand casting. The replacement piece 802 may be fitted and welded onto the undamaged portion 804 along the cut-interface with a weld 810.

In an alternative embodiment, the replacement piece may be directly printed onto the ultra-large casting along the cut-interface using Direct Energy Deposition (DED). DED is one type of additive manufacturing method that adds material alongside a simultaneous heat input. The heat input can either be a laser, electron beam, or plasma arc. The material feedstock is either metal powder or wire. Moving to Block 314 from Block 312.

In Block 314, if the replacement piece was directly printed onto the ultra-large casting along the cut line, the DED printed replacement piece may be machined to specifications. The Method 300 ends.

The Method 300 may be applied to any size of castings, but more beneficial to ultra-large and complex casting, such as mega/giga casting. Based on computer aided engineering analysis, the mechanical and physical performance of an in-situ repaired ultra-large casting, in accordance with Method 300, is at least as good as or better than an undamaged original ultra-large casting. The additively manufactured replacement piece can be specifically designed, using computer simulation tools such as, but not limited to, topology optimization or generative design, to achieve equivalent performance to the original casting. This can be inclusive of select or all replacement piece performance requirements and enable the same or dissimilar materials to be used for the replacement piece.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A method of repairing a cast component, comprising:
   locating a damaged portion of the cast component;
   determining an extent of the damaged portion of the cast component;
   defining a cut-line sectioning off the damaged portion from an undamaged portion of the cast component;
   cutting along the cut-line to excise the damaged portion from the undamaged portion of the cast component; and
   joining a replacement piece to the undamaged portion of the cast component;
   wherein joining the replacement piece to the undamaged portion of the cast component includes:
   providing a plurality of bolt brackets on the replacement piece, wherein each of the plurality of bolt brackets defines a bolt through-hole;
   drilling a plurality of bolt through-holes on the undamaged portion of the cast component, wherein the drilled bolt through-holes correspond to the bolt through-holes of the plurality of bolt brackets when the replacement piece is joined to the undamaged portion of the cast component; and
   bolting the replacement piece onto the undamaged portion of the cast component.

2. The method of claim 1, wherein determining the extent of the damaged portion of the cast component, comprising:
   determining whether the damaged portion includes a load bearing structure; and
   defining the cut-line to avoid cutting into the load bearing structure when the damaged portion does not include the load bearing structure.

3. The method of claim 2, further comprises defining the cut-line to include a damaged load bearing structure portion when the damaged portion includes the load bearing structure.

4. The method of claim 3, wherein joining the replacement piece includes one of welding the replacement piece to the undamaged portion of the cast component and bolting the replacement piece to the undamaged portion of the cast component.

5. The method of claim 1, further comprising designing the replacement piece by using geometry and dimension data from a design specification of the cast component.

6. The method of claim 1, wherein fabricating the replacement piece includes sand casting the replacement piece.

7. The method of claim 1, wherein fabricating the replacement piece includes additive manufacturing the replacement piece based on original manufacturer design data.

8. The method of claim 7, wherein additive manufacturing includes at least one of a friction stir additive manufacturing, a powder bed fusion (PBF), a direct energy deposition (DED), and a droplet on demand (DOD) using cast aluminum alloy feed stock and powders.

9. The method of claim 1, wherein the cast component is a floor casting of a vehicle.

10. The method of claim 9, wherein the cast component is a battery tray of a vehicle.

11. A method of in-situ repairing of an ultra-large casting of a vehicle body component, comprising:
    locating a damaged portion of the ultra-large casting;
    inspecting the damaged portion to determine whether a load bearing structure is damaged;
    defining a cut-line to avoid the load bearing structure when the load bearing structure is not damaged and defining the cut-line to include a damaged load bearing structure portion when the load bearing structure is damaged;
    cutting through the ultra-large casting at the cut-line to remove the damaged portion from an undamaged portion of the ultra-large casting; and
    joining a replacement piece to the undamaged portion of the ultra-large casting to replace the damaged portion;
    wherein joining the replacement piece to the undamaged portion of the ultra-large casting to replace the damaged portion includes:
    providing a plurality of bolt brackets on the replacement piece, wherein each of the plurality of bolt brackets defines a bolt through-hole;
    drilling a plurality of bolt through-holes on the undamaged portion of the cast component, wherein the drilled bolt through-holes correspond to the bolt through-holes of the plurality of bolt brackets when the replacement piece is joined to the undamaged portion of the ultra-large casting; and bolting the replacement piece onto the undamaged portion of the cast component.

12. The method of claim 11, wherein the ultra-large casting includes a width of at least 0.8 meter (m), a length of at least 1 m, and a height of at least 0.25 m.

13. The method of claim 11, wherein joining the replacement piece to the undamaged portion of the ultra-large casting includes welding the replacement piece to the undamaged portion of the ultra-large casting when load bearing structure is damaged.

14. A method of in-situ repairing of an ultra-large die casting cast in a 2-piece die, comprising:

defining a cut-line sectioning off a damaged portion from an undamaged portion of the ultra-large casting;

excising the damaged portion by cutting along the cut-line;

fabricating a replacement piece; and joining the replacement piece to the ultra-large casting in place of the excised damaged portion; and wherein the ultra-large die casting includes a projected area of at least 0.3 $m^2$ on a projection plane parallel to a parting plane of the 2-piece die.

15. The method of claim 14, further comprising:

determining a damaged load bearing structure;

defining the cut-line to include the damaged load bearing structure; and one of welding the replacement piece to the ultra-large casting and bolting the replacement piece to the ultra-large casting.

16. The method of claim 14, wherein joining the replacement piece to the ultra-large casting in place of the excised damaged portion includes:

providing a plurality of bolt brackets on the replacement piece, wherein each of the plurality of bolt brackets defines a bolt through-hole;

drilling a plurality of bolt through-holes on the undamaged portion of the cast component, wherein the drilled bolt through-holes correspond to the bolt through-holes of the plurality of bolt brackets when the replacement piece is joined to the undamaged portion of the cast component; and bolting the replacement piece onto the undamaged portion of the cast component.

17. The method of claim 14, wherein fabricating the replacement piece includes sand casting the replacement piece.

18. The method of claim 14, wherein fabricating the replacement piece includes additive manufacturing the replacement piece based on original manufacturer design data.

19. The method of claim 14, wherein the ultra-large die casting is a floor casting of a vehicle body.

20. The method of claim 19, wherein the undamaged portion of the ultra-large casting is not removed from the vehicle body during joining the replacement piece to the ultra-large casting in place of the excised damaged portion.

* * * * *